Figure 1:
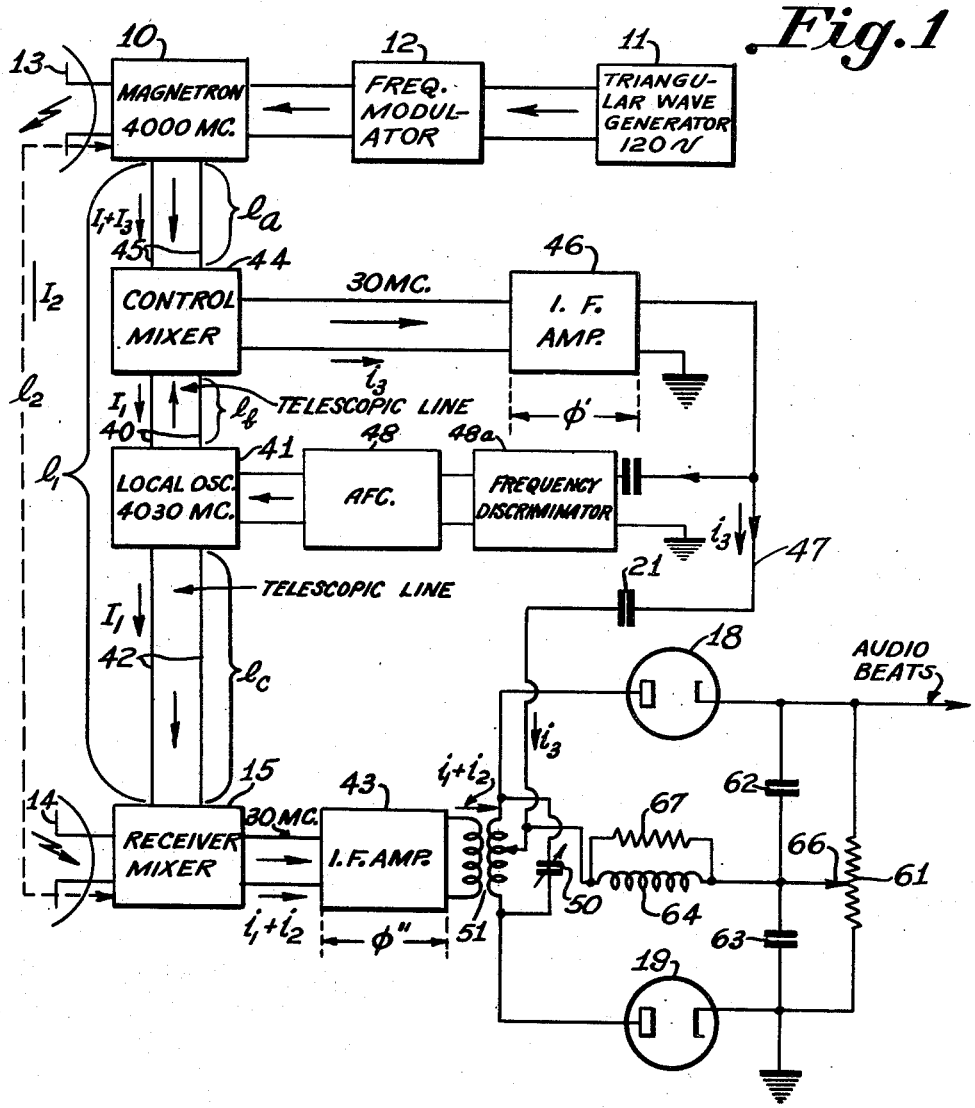

Feb. 6, 1951  R. A. BRADEN  2,540,506
RADAR SYSTEM OF SUPERHETERODYNE
FREQUENCY MODULATED TYPE
Filed Dec. 28, 1946  2 Sheets-Sheet 1

Inventor
*Rene A. Braden*
Attorney

Inventor
Rene A. Braden
Attorney

Patented Feb. 6, 1951

2,540,506

UNITED STATES PATENT OFFICE 2,540,506

RADAR SYSTEM OF SUPERHETERODYNE FREQUENCY-MODULATED TYPE

Rene A. Braden, Princeton, N. J., assignor to Radio Corporation of America, a corporation of Delaware Application December 28, 1946, Serial No. 718,915

10 Claims. (Cl. 343—14)

My invention relates to radar systems and particularly to systems of the frequency modulated or FM type. In frequency modulated or FM radar systems there is transmitted a radio wave that is frequency modulated at a periodic rate by a sine wave or by a linear wave such as a sawtooth or triangular wave. This modulated wave is received after reflection and supplied to a mixer which also has supplied to it frequency modulated signal direct from the transmitter. There appears in the output of the mixer a beat frequency signal or, in the case of a superheterodyne circuit, an I.-F. signal carrying the beat frequency signal. The frequency of the beat frequency signal is a function of the distance to the reflecting object. A system of this type without superheterodyning is described in Bentley Patent 2,011,392. The invention will be described with specific reference to a system employing superheterodyne principles which is described and claimed in application Serial No. 508,031, filed October 28, 1943, in the name of Wendell L. Carlson and entitled Superheterodyne Radio Altimeter or Locator, now Patent 2,424,796, issued July 29, 1947.

It has been found, particularly when employing very high frequencies, that in systems of the type referred to above there is considerable difficulty in obtaining the desired results because of undesired amplitude modulation effects which may result either from amplitude or frequency modulation of the transmitter oscillator. This difficulty is caused largely by cross-feed or cross-coupling of signal from the transmitter portion of the system, to the receiver portion of the system. There are two cross-feed paths, one being a radiation leakage path from the transmitter antenna to the receiving antenna which is present regardless of the use of sharply directive antennas, shielding, etc. The other cross-feed path is through the cables and electrical apparatus interconnecting the transmitter and receiver.

Unless special precautions are taken, the effect of the two cross-feed or cross-coupling signals is to introduce an amplitude modulation signal in the audio output of the system which may be of sufficient magnitude to mask out the desired audio signal resulting from signal reflected from a target. Such difficulty is encountered particularly where the transmitter oscillator is a magnetron because a magnetron is subject to both amplitude and frequency modulation caused by ripple in the anode voltage supply, by the magnetic field set up by alternating current in the cathode heater, by fluctuations in the cooling air blast, and by mechanical vibration of the magnetron. The cross-coupling currents are usually much stronger than the normal signal currents, and for this reason are very troublesome if they are noise or ripple modulated as in the manner mentioned above, for example. As will be pointed out hereinafter, any spurious frequency modulation such as mentioned above shows up eventually as the equivalent of an amplitude modulation and may be more troublesome than an actually amplitude modulation.

An object of the present invention is to provide an improved method of and means for minimizing the effects of cross-coupling currents in a frequency modulated radar system.

A further object of the invention is to provide an improved radar system of the frequency-modulated type.

According to a main feature of the present invention the system is so designed that a frequency modulation balance may be obtained by making the cable lengths in a cross-feed path the proper length whereby the relative phase modulation of each of the two cross-coupling currents at the second detector of the system is made zero with respect to the phase of the local oscillator signal at that point. It will be shown that this makes it impossible for the spurious frequency modulation to be converted into amplitude modulation.

Figure 2:
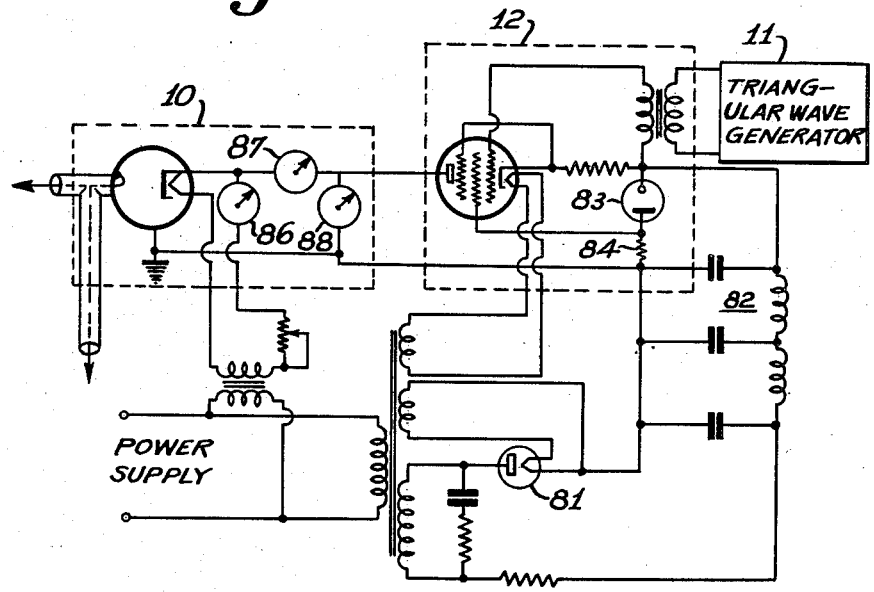
Figure 3:
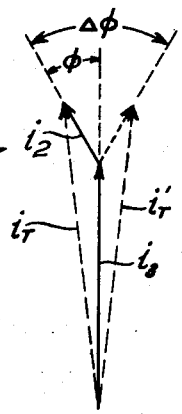
Figure 4:
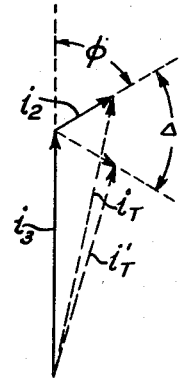

The invention will be better understood from the following description taken in connection with the accompanying drawing in which:

Figure 1 is a block and circuit diagram illustrating one embodiment of the invention, Figure 2 is a circuit diagram of a portion of the circuit shown in block in Fig. 1, and Figures 3 and 4 are vector diagrams that are referred to in explaining the invention. In the several figures similar parts are indicated by similar reference characters.

In the drawing there is shown an FM radar system such as an FM altimeter which comprises a radio transmitter oscillator 10 such as a magnetron. The oscillator 10 is cyclically frequency modulated by triangular waves from a generator 11, for example, applied to suitable frequency modulation means 12.

The frequency modulated wave is radiated from an antenna 13, such as a dipole in a parabolic reflector. The wave, after reflection from an object or surface, is picked up by a receiving antenna 14.

The received signal is applied to a first detector or receiver mixer 15 which is of any suitable type such as that described and claimed in application Serial No. 625,911, filed October 31, 1945, now abandoned, in the name of Rene A. Braden.

Mixing signal is supplied from a local oscillator 41 to the mixer 15 by way of cable conductors 42 having a length $l_c$. Since, in the example illustrated, the transmitter frequency is 4000 mc. and the local oscillator frequency is 4030 mc., this results in a 30 mc. I.-F. signal. This I.-F. signal is passed through an I.-F. amplifier 43 and through a transformer 51 to the anodes 16 and 17 of the diodes 18 and 19, respectively, that comprise the second detector or balanced mixer. The transformer 51 is tuned to the intermediate frequency by means of a capacitor 50.

A second I.-F. signal of 30 mc. is obtained by supplying signals from the local oscillator 41 and from the transmitter oscillator 10 to a control mixer 44 by way of cable conductors 40 and 45, respectively, having lengths $l_b$ and $l_a$, respectively. This I.-F. signal is passed through an I.-F. amplifier 46 and over a lead 47 to the midpoint of the secondary of the transformer 51. A coupling capacitor is indicated at 21. The control mixer 44 may be of the type described in the above-mentioned Braden application.

The two cross-feed or cross coupling paths previously referred to are indicated in Fig. 1 as the paths $l_1$ and $l_2$. The path $l_1$ is the sum of the paths $l_a$, $l_b$ and $l_c$. The path $l_2$ is the direct or leakage radiation path from the transmitter antenna 13 to the receiving antenna 14 plus the conductor or cable lengths between transmitter 10 and antenna 13 and between mixer 15 and antenna 14. The effects of cross-coupling currents can be minimized by selecting the proper cable lengths provided certain other circuit conditions have been satisfied. More specifically, as explained hereinafter, the best circuit condition is where the two I.-F. amplifiers have similar phase shift characteristics, where $l_b = 0$, and where $l_a + l_c = l_2$. In practice, this ideal condition may be approached very closely.

Preferably, an automatic frequency control or AFC circuit 48 that receives signal through a frequency discriminator 48a is provided as described in the above-identified Carlson application for reducing the frequency band that must be passed by the I.-F. amplifiers. The local oscillator 41 may be a reflex Klystron that is frequency modulated by having the AFC circuit 48 vary the negative bias voltage on the reflector electrode of the Klystron.

It will be seen that the I.-F. signal from the amplifier 43 is applied to the diodes 18 and 19 in push-pull relation by way of the transformer 51. It will also be seen that the I.-F. signal from the amplifier 46 (which is identified as the local oscillator signal $i_3$) is applied over the lead 47 in parallel relation to the diodes 18 and 19.

The cathodes of the diodes 18 and 19, respectively, are connected to opposite ends of an output resistor 61. The mid-point of the resistor 61 connected through a variable tap 66 to the junction point of a pair of like value capacitors 62 and 63 that are connected across the resistor 61. Connected between said capacitor junction point and the mid-point of the secondary of transformer 51 is an inductance coil 64 that is shunted by a resistor 67.

It will be evident that by adjusting the tap 66, it is possible to obtain a balance in the detector output circuit, i. e., a condition such that equal modulated signals applied to the two diodes produce exactly zero output voltage across the resistor 61.

It will be understood that the I.-F. signal passed by the amplifier 43 varies cyclically in frequency due to the frequency modulation on the radiated wave, 30 mc. being the mean frequency in the example given. The upper and lower frequency limits may be 31 mc. and 29 mc. for instance, or a frequency sweep of 2 mc., assuming there is no AFC action. There is, of course, the same frequency sweep on the 30 mc. I.-F. carrier passed through the I.-F. amplifier 46. The instantaneous frequency difference between the two I.-F. signals, which difference is a function of the propagation time required for the radio wave to travel to the reflecting object and back, is the desired audio frequency beat signal that is amplified and supplied to a frequency counter, not shown. As previously stated, an AFC action preferably is employed so that in the example given the frequency sweep of the I.-F. signals is substantially less than 2 mc.

Fig. 2 shows, merely by way of example, one suitable circuit for cyclically frequency modulating the transmitter magnetron 10. The magnetron is frequency modulated by varying its anode current as a function of the triangular wave supplied from generator 11. The anode current variation is obtained by employing a pentode as the modulator tube 12. Since the anode-cathode impedance of the pentode is high compared with the impedance of the magnetron, the desired current control and resulting frequency modulation can be obtained by varying the pentode impedance. This is done by applying the modulating wave to the control grid of the pentode.

The high voltage supply for the magnetron includes the usual rectifier 81 and filter 82. A glow lamp 83 and resistor 84 are connected in series across the filter output terminals and the second grid of the pentode is connected to the constant voltage point thus provided at the junction of the glow lamp and resistor. Suitable meters may be provided as indicated at 86, 87 and 88.

It has been found that the difficulties resulting from noise modulation of the magnetron are due more to frequency modulation than to amplitude modulation, both types of noise modulation appearing in the second detector output as an amplitude modulation effect.

First the effects of frequency modulation by noise will be discussed and it will be shown how such effects can be reduced. Later, it will be shown how any remaining effects due to amplitude modulation by noise can be reduced.

The reason that spurious frequency modulation of the magnetron results in undesired amplitude variations in the second detector output will be understood by referring to Figs. 3 and 4 of the drawing.

First, it should be understood that the circuit which is referred to as the second detector actually functions as a mixer or converter. The current $i_3$ plays the part of a local oscillator, and in accordance with usual practice this current is relatively strong. The various currents amplified in amplifier 43 correspond to the signal input of a mixer, and are relatively weak. There are three principal components of this signal, namely, the received signal, and the two leakage currents which are designated $i_1$ and $i_2$, respectively. Each current component is heterodyned by the current $i_3$, and the difference frequency is passed on to the audio circuits following. Each component acts entirely independently of the others, and the corresponding output currents are added in the output circuit. Furthermore, each diode acts independently of the other and the resulting output vectors are added in the output circuit.

In Figs. 3 and 4, the action of the current $i_2$ has been shown graphically by way of example. Its amplitude relative to that of $i_3$ is shown by the relative lengths of the arrows corresponding to the two currents. The phase relation between them is shown by the angle between the arrows. Referring to Fig. 4, if the I.-F. currents $i_2$ and $i_3$ at the input of the second detector have the phase relation shown in solid lines, they will add to give the resultant current $i_T$. If their relative phase changes by the amount $\Delta\phi$, as shown in broken lines, the resultant current is $i_T'$ which is substantially less amplitude than the current $i_T$. Therefore, if the phase between the two currents is modulated periodically, it looks to the second detector as though there is amplitude modulation on the signal supplied from the I.-F. amplifier 43. In Fig. 4 the mean value of the angle $\phi$ is 90 degrees.

In Fig. 3, there is shown the case where the mean value of the angle $\phi$ is zero. It is evident that a small frequency modulation producing a phase difference $\Delta\phi$ causes only a small amplitude modulation effect if $\phi$ is zero and a much larger amplitude modulation effect if $\phi$ is 90 degrees.

Equations will now be derived showing how the circuit may be designed and adjusted to minimize the effects of frequency modulation due to noise or the like.

Consider a transmitter T and a receiver R having two paths of lengths $l_m$ and $l_n$, respectively, between them. Relative to the phase angle of the generated current at T, the phase angle $\theta$ of a current R is the phase shift along the line $l_m$ carrying the current, and this phase shift is 360° per wavelength $\lambda$. Therefore, $$\theta_m = \frac{l_m}{\lambda} 360° = 360 \frac{l_m f}{c} \text{ since } c = f\lambda$$

where $f$=signal frequency in cycles per second and $c$=velocity of light=$3\times10^{10}$ cm./sec. Likewise, the phase angle $\theta_n$ at R of the current over line $l_n$ is $$\theta_n = \frac{l_n}{\lambda} 360° = 360 \frac{l_n f}{c}$$

The phase difference between the two currents reaching R is $$\theta_m - \theta_n = \frac{360(l_m - l_n) f}{c}$$

The change of this phase difference corresponding to a frequency change $\Delta f$ is $$\Delta\theta_m - \Delta\theta_n = \Delta\phi = \frac{360}{3\times10^{10}}(l_m - l_n) \times \Delta f$$

or $$\Delta\phi = \frac{360}{3\times10^4}(l_m - l_n) \times \Delta F$$

or $$\Delta\phi = \frac{1.2}{10^2}(l_m - l_n) \times \Delta F$$

where lengths are measured in cm., $\Delta f$ is measured in cycles per sec.
$\Delta F$ is measured in megacycles per sec.

Above, $l_m$ and $l_n$ are equivalent lengths, corrected for the effect of the dielectric constant $\epsilon$ of the transmission line or cable insulation. In applying the above equation for $\Delta\phi$ to the circuit of Figure 1 it is necessary to proceed in several steps corresponding to separate parts of the circuit. These steps are as follows: (and by way of example, $i_2$ will be considered, but it is to be understood that precisely the same argument applies to the analysis of $i_1$):

1. The path length of $l_3$ from the magnetron 10 to the control mixer 44 will be compared with the path length of $l_2$ from the magnetron 10 to the receiver mixer 15. The difference between these two path lengths determines the relative phase modulation of the mixer input currents.

2. The path lengths from the local oscillator to the two mixers, 44 and 15, will be compared. The difference determines the relative phase modulation of the local oscillator currents at the two mixers.

3. The phase modulation of the I.-F. output currents of the two mixers, relative to each other, is the algebraic sum of the two components in paragraphs 1 and 2 above.

4. An additional component of relative phase modulation resulting from the difference between the phase characteristics of the two I.-F. amplifiers is added to the sum obtained in paragraph 3 above. This gives the relative phase modulation between these two currents, at the second mixer (18, 19 and associated circuits). If the local oscillator is controlled by an AFC circuit in such a way as to reduce the frequency modulation in the I.-F. amplifiers, this is taken account of. The relative phase modulation component which is produced in the I.-F. amplifiers is $$k\Delta F\left(\frac{\Delta\phi''}{\Delta F} - \frac{\Delta\phi'}{\Delta F}\right)$$

In this equation, $k$ is the ratio of frequency modulation width in the I.-F. circuits to the modulation width of the magnetron, and $\Delta\phi/\Delta F$ is the phase slope of either amplifier, from the mixer to the double diode circuit. In performing the addition specified in paragraph 3, it should be kept in mind that where two currents of different frequencies are applied to a mixer to obtain an I.-F. current, the following statements are true:

(a) If the phase angle of the higher frequency current is changed, the phase angle of the I.-F. current changes the same amount and in the same direction.

(b) If the phase angle of the lower frequency current is changed, the phase angle of the I.-F. current changes the same amount and in the opposite direction.

Now referring to Fig. 1, consider first the cross-coupling current due to antenna coupling through $l_2$.

A comparison of the phase of the I.-F. current $i_2$ with respect to that of the I.-F. current $i_3$ may be made as follows:

First consider the current from the magnetron 10 to the mixers 44 and 15.

If $l_3 > l_2$ the input to the control mixer 44 is behind the input to the receiver mixer 15. Now, ignoring the effect of the phase relation of the current from the local oscillator to the mixers 44 and 15 and assuming for the moment that the local oscillator currents are in phase at the mixers 44 and 15, it follows that (remembering the phase angle of the lower frequency was changed):

The output $i_3$ of mixer 44 is ahead of the output $i_2$ of the mixer 15.

It is evident that the phase lag of $i_2$ behind $i_3$ is a function of $l_a - l_2$, the difference in path lengths. In deriving this phase relation, other influences which affect the phase relation were ignored since they all add linearly, and it simplifies matters to assume for the moment that all other influences are zero.

Next consider the current from the local oscillator 41 to the mixers 44 and 15.

If $l_c > l_b$ the input to the control mixer 44 is ahead of the input to the receiver mixer 15. This time ignoring the effect of the phase relation of the current from the magnetron to the mixers 44 and 15 and assuming for the moment that the magnetron currents are in phase at the mixers 44 and 15, it follows that (remembering that this time the phase angle of the higher frequency current was changed):

The output $i_3$ of mixer 44 is ahead of the output $i_2$ of the mixer 15.

Here it is evident that the phase lag of $i_2$ behind $i_3$ is a function of $l_c - l_b$, the difference in path lengths.

So far two partial phase differences between the I.-F. currents $i_2$ and $i_3$ have been found, one resulting from the phase difference of the currents to the mixers from the magnetron, and the other resulting from the phase difference of the currents to the mixers from the local oscillator. The two effects add so that now the equation for the total phase difference $\Delta\phi_2$ between the I.-F. currents $i_2$ and $i_3$ (at the mixer outputs) when the frequency changes by the amount $\Delta F$ may be written as follows:

$$\Delta\phi_2 = 1.2 \times 10^{-2} \times \Delta F[(l_a - l_2) + (l_c - l_b)]$$

Next consider the cross-coupling current due to coupling between circuits through $l_1$.

A comparison of the phase of the I.-F. current $i_1$ with that of the I.-F. current $i_3$ may be made as follows:

First consider the current from the magnetron 10 to the mixers 44 and 15.

If $l_1 > l_a$ the input to the control mixer 44 is ahead of the input to the receiver mixer 15, assuming for the moment that the local oscillator currents are in phase at the mixers 44 and 15, it follows that (remembering the phase angle of the lower frequency current was changed):

The output $i_3$ of control mixer 44 is behind the output $i_1$ of the receiver mixer 15. Or, inversely, if $l_a > l_1$ (a mathematical assumption only):

The output $i_3$ is ahead of the output $i_1$.

It is evident that the phase lag of $i_1$ behind $i_3$ is a function of $l_a - l_1$, the difference in path lengths.

Next consider the current from the local oscillator 41 to the mixers 44 and 15.

If $l_c > l_b$ the input to mixer 15 is behind the input to mixer 44. Assuming for the moment that the magnetron currents to the mixers 44 and 15 are in phase it follows that (remembering that this time it is the phase angle of the higher frequency current that was changed):

The output $i_1$ of the mixer 15 is behind the output $i_3$ of the mixer 44.

It is evident that the phase lag of $i_1$ behind $i_3$ is a function of $l_c - l_b$, the difference in path lengths.

Now two partial phase differences between the I.-F. currents $i_1$ and $i_3$ have been found, the two effects add so that the equation for the total phase difference $\Delta\phi_1$ between the I.-F. currents $i_1$ and $i_3$ (at the mixer outputs) when the frequency changes by the amount $\Delta F$ may be written as follows:

$$\Delta\phi_1 = 1.2 \times 10^{-2} \times \Delta F[(l_a - l_1) + (l_c - l_b)]$$

In the foregoing analysis the phase characteristics of the crystal detector or mixer cavities have been ignored. This may be done because the crystal cavities have been designed so that phase change due to the selectivity of each crystal cavity is very small, and furthermore they are alike, so that the difference between their phase characteristic is extremely small.

It is evident from the foregoing that the rate per megacycle at which the phase angles $\Delta\phi_1$ and $\Delta\phi_2$ between $i_1$ and $i_3$ and between $i_2$ and $i_3$, respectively, change at the input of the second detector if the frequency is altered is given by the following expressions:

$$\frac{\Delta\phi_1}{\Delta F} = 1.2 \times 10^{-2}[(l_a - l_1) + (l_c - l_b)] + \frac{k}{\Delta F}(\Delta\phi'' - \Delta\phi') \quad (1)$$

$$\frac{\Delta\phi_2}{\Delta F} = 1.2 \times 10^{-2}[(l_a - l_2) + (l_c - l_b)] + \frac{k}{\Delta F}(\Delta\phi'' - \Delta\phi') \quad (2)$$

where
$\Delta\phi_1$ = change in phase angle between $i_1$ and $i_3$.
$\Delta\phi_2$ = change in phase angle between $i_2$ and $i_3$.
$\Delta F$ = change in frequency in megacycles per second.
$l_a$ etc. = electrical length in cm. (actual length $\times \epsilon$).
$\epsilon$ = dielectric constant of cable insulation.
$k$ = ratio of frequency change of I.-F. current to the frequency change of the magnetron current.
  = 1.0 without AFC, and = 0.02 to 0.1 for example, with AFC.
$\frac{\Delta\phi'}{\Delta F}$ = phase slope of the receiver or signal I.-F. amplifier 43 in degrees per megacycle frequency change.
$\frac{\Delta\phi''}{\Delta F}$ = phase slope of the control I.-F. amplifier 46 in degrees per megacycle frequency change.

As previously indicated, the interfering effect of cross-coupling currents may be greatly reduced by reducing the amount of phase modulation. The Equations 1 and 2 indicated how this may be done by matching the cross-coupling path lengths and the phase slopes of the I.-F. amplifiers. Thus, $$\frac{\Delta\phi_1}{\Delta F} = 0 \text{ if } l_1 - l_a + l_b - l_c = \frac{k}{1.2 \times 10^{-2}}\left(\frac{\Delta\phi''}{\Delta F} - \frac{\Delta\phi'}{\Delta F}\right) \quad (3)$$

$$\frac{\Delta\phi_2}{\Delta F} = 0 \text{ if } l_2 - l_a + l_b - l_c = \frac{k}{1.2 \times 10^{-2}}\left(\frac{\Delta\phi''}{\Delta F} - \frac{\Delta\phi'}{\Delta F}\right) \quad (4)$$

From (3), since $l_1 = l_a + l_b + l_c$, $$\frac{\Delta\phi_1}{\Delta F} = 0 \text{ if } l_a + l_b + l_c - l_a + l_b - l_c =$$

$$\frac{k}{1.2 \times 10^{-2}} \times \left(\frac{\Delta\phi''}{\Delta F} - \frac{\Delta\phi'}{\Delta F}\right)$$

or $$2l_b = \frac{10^2 k}{1.2}\left(\frac{\Delta\phi''}{\Delta F} - \frac{\Delta\phi'}{\Delta F}\right) \quad (5)$$

Equation 5 shows that if $\Delta\phi''/\Delta F > \Delta\phi'/\Delta F$, a cable length $l_b$ can be chosen which results in a sort of frequency modulation balance which makes the relative phase modulation of $i_1$ and $i_3$ at the second mixer exactly zero. This makes it impossible for the frequency modulation to be converted into amplitude modulation (assuming that there are no excessively selective tuned circuits which can act as frequency modulation detectors).

However, it will be noted that this balance depends on the value of $k$, the control ratio of the automatic frequency control circuit, which is not necessarily perfectly constant, either over long periods of time or over wide operating frequency ranges. For this reason and because of the critical nature of a balance involving a large value of $l_b$, it is best to match the two I.-F. circuits as closely as possible, and to make $l_b$ as short as possible. Thus $$\frac{\Delta\phi_1}{\Delta F}=0 \text{ if } l_b=0, \text{ and if } \frac{\Delta\phi''}{\Delta F}=\frac{\Delta\phi'}{\Delta F} \quad (6)$$

This condition should be approached as closely as possible.

In a similar manner, neutralization of the effects of $i_2$ is accomplished by satisfying the requirements of Equation 4 which may be rearranged as follows:

$$\frac{\Delta\phi_2}{\Delta F}=0 \text{ if } (l_2+l_b)-(l_a+l_c)=\frac{100k}{1.2}\left(\frac{\Delta\phi''}{\Delta F}-\frac{\Delta\phi'}{\Delta F}\right) \quad (7)$$

Again it is best to make the phase slopes of the two amplifiers equal, and the condition for neutralizing the cross-coupling current $i_2$ is then $$\frac{\Delta\phi_2}{\Delta F}=0 \text{ if } (l_2+l_b)=(l_a+l_c) \text{ and } \frac{\Delta\phi''}{\Delta F}=\frac{\Delta\phi'}{\Delta F} \quad (8)$$

The conditions to be satisfied to neutralize both $i_1$ and $i_2$ simultaneously are found by combining Equations 6 and 8:

$$\frac{\Delta\phi_1}{\Delta F}=0=\frac{\Delta\phi_2}{\Delta F}$$

$$l_b=0 \quad (9)$$

if $$l_2=l_a+l_c$$

$$\frac{\Delta\theta''}{\Delta F}=\frac{\Delta\theta'}{\Delta F}$$

The cable sections of lengths $l_a$, $l_b$ and $l_c$ preferably have high loss or, if low loss cables are employed, attenuation means is inserted for each cable section. The cables may be given a high loss by employing a suitable dielectric, for example. By providing high loss in these cable sections resonant effects are avoided. More important, high loss in the sections $l_b$ and $l_c$ minimizes the amount of magnetron signal fed through the cables from the control mixer 44 to the receiver mixer 15. The power of the local oscillator 41 is made great enough to supply the desired value of local oscillator signal to the mixers 44 and 15 in spite of the high loss in the cable sections $l_b$ and $l_c$.

Preferably, several of the cable sections are provided with "line stretchers" which may take the form of telescoping line sections. This is for the purpose of making the final precise adjustment for exact balance discussed hereinafter.

In actual practice it may be found that because of line changes with changes in temperature, because of the difficulty in making the two I.-F. amplifiers have exactly the same phase shift characteristics, and because of various other effects, it is not possible to eliminate completely the effects of spurious frequency modulation of the magnetron. That is, referring to Fig. 4, for example, $\Delta\phi$ may not be reduced exactly to zero but merely reduced to a small value.

The effects of this residual $\Delta\phi$ variation may be reduced to a minimum by adjusting one of the cable lengths until the phase angle $\phi$ is that shown in Fig. 3 so that the vector of $i_2$ varies about a zero value of $\phi$. Similarly, the vector of $i_1$ may be rotated by adjusting a different cable length to make this vector vary about a zero value of $\phi$, where this is now the phase angle of $i_1$, with respect to $i_3$. Actually, one phase adjustment affects the other so that the two cable sections must be adjusted together. As to the two sections that may be adjusted for this purpose, $l_b$ and $l_c$ may be adjusted simultaneously, or $l_c$ and the cable section between the antenna 14 and the mixer 15 may be adjusted simultaneously.

It has also been found that there usually is some amplitude modulation on the magnetron signal. This amplitude change normally is in phase (audio phase) with the magnetron frequency changes due to the spurious frequency modulation, the amplitude and the frequency changing simultaneously.

The amplitude modulation on the cross-coupling currents $i_1$ and $i_2$ and the residual frequency modulation effect can be balanced against each other by making only slight changes in two of the line lengths. The cable lengths $l_b$ and $l_c$ or $l_c$ and the receiver cable section may be adjusted further to obtain the above balance. By observing on an oscilloscope the output of the second detector 18, 19 it is possible to adjust for the best balance. When there is minimum signal variation indicated on the oscilloscope, the amplitude modulation on the currents $i_1$ and $i_2$ has been brought into phase opposition with the residual frequency modulation.

In making the above-described final adjustment of the "line stretchers" for balancing the amplitude modulation on $i_1$ and $i_2$ against a residual frequency modulation effect, there is a slight upsetting of the phase condition illustrated in Fig. 3, the adjustment of Fig. 3, being the ideal one if there were no amplitude modulation on $i_1$ and $i_2$. After this final adjustment has been made, the vector of $i_2$ (and similarly the vector of $i_1$) is positioned somewhere between the positions shown in Figs. 3 and 4, assuming that this brings the amplitude variation due to spurious frequency modulation in phase opposition to the amplitude variation or modulation on the currents $i_1$ and $i_2$. It should be kept in mind that this amplitude variation is at an audio rate which may be 120 cycles per second in the present example. If these two amplitude variations are not in phase opposition under the above-mentioned condition, they are in phase aiding, and may be brought into phase opposition by swinging the current vector $i_2$ (also $i_1$) through 180° counter-clockwise. It will be apparent that in one case a slight rotation forward of the $i_2$ vector will increase the length of vector $i_T$ while in the other case a similar rotation will decrease the length of vector $i_T$. Thus, the two amplitude variations can always be brought into phase opposition.

From the previous comparison of Figs. 3 and 4 it will be evident that the two variations can be balanced as to amplitude by adjusting the magnitude of the angle $\phi$ since the amplitude variation due to spurious frequency modulation is a minimum at Fig. 3 and increases if the median value of $\Delta\phi$ is swung in either direction, the direction of the swing determining the phasing as stated above.

The changes in cable lengths for obtaining a balance of amplitude and frequency modulation effects are very small percentage changes of cable length and are made by means of the telescoping line sections or "line stretchers." Therefore, after the final adjustment has been made, the line or cable length relations are still the same as determined by the equations in the foregoing description.

It may be noted that in practice the line section $l_b$ may be about one foot long, for example. It obviously cannot be exactly of zero length. The line sections $l_a$ and $l_c$ may be, for example, 10 or 20 times the length of this short section $l_b$. These examples are given merely to give an indication of how the invention may be applied in practice.

Instead of the above final adjustment of the "line stretchers" for balancing one amplitude variation against the other, the final balancing out adjustment may be made by adjusting the tap 66. In this way, the amplitude modulation on the current $i_3$ may be made to balance out the other amplitude variation introduced by the currents $i_1$ and $i_2$. The amplitude modulation on $i_3$ will be either in phase with or in phase opposition to the said other amplitude variations depending upon whether the tap 66 is above or below the balance point on the resistor 61.

It has been found in practice that it usually is preferable to obtain a final balance by adjusting both the "line stretchers" as described above and by also adjusting the tap 66. Such adjustments may be made simultaneously while observing an oscilloscope that shows when amplitude modulation effects are a minimum.

I claim as my invention:

1. In a radio locator system of the type utilizing reflected waves, transmitting means including transmitter antenna and a transmitter oscillator for transmitting a radio signal to a wave reflecting surface, means including a receiver antenna and a receiver mixer for receiving said signal after it has been reflected from said wave reflecting surface, means including a local heterodyne oscillator for heterodyning said reflected signal to an intermediate-frequency signal, amplifying means for amplifying said intermediate-frequency signal, a second detector to which the intermediate-frequency signal is applied, means for applying to said second detector a beating signal having said local oscillator as its source for producing a beat-frequency signal, said system having an unavoidable cross-coupling path from the transmitter oscillator to the receiver mixer, the current traversing said cross-coupling path appearing at the input circuit of said second detector as an intermediate-frequency leakage current, and means for maintaining the phase of said leakage current with respect to said beating current substantially constant whereby amplitude modulation effects due to spurious frequency modulation of the transmitter oscillator are avoided.

2. In a radio locator system of the type utilizing reflected waves, transmitting means including transmitter antenna and a transmitter oscillator for transmitting a radio signal to a wave reflecting surface, means including a receiver antenna and a receiver mixer for receiving said signal after it has been reflected from said wave reflecting surface, means including a local heterodyne oscillator for heterodyning said reflected signal to an intermediate-frequency signal, amplifying means for amplifying said intermediate-frequency signal, a second detector to which the intermediate-frequency signal is applied, means for applying to said second detector a beating signal having said local oscillator as its source for producing a beat-frequency signal, said system having two unavoidable cross-coupling paths $l_1$ and $l_2$ from the transmitter oscillator to the receiver mixer, the path $l_1$ comprising cables or conductors interconnecting said transmitter oscillator and said receiver mixer, and the path $l_2$ being a path by way of the leakage radiation path between the two antennas, the two currents traversing said two cross-coupling paths appearing at the input circuit of said second detector as two intermediate-frequency currents $i_1$ and $i_2$, and means for maintaining the phase of the currents $i_1$ and $i_2$ with respect to said beating current substantially constant whereby amplitude modulation effects due to spurious frequency modulation of the transmitter oscillator are avoided.

3. In a radio locator system of the type utilizing reflected waves, transmitting means including transmitter antenna and a transmitter oscillator for transmitting a radio signal to a wave reflecting surface, means including a receiver antenna and a receiver mixer for receiving said signal after it has been reflected from said wave reflecting surface, means including a local heterodyne oscillator for heterodyning said reflected signal to an intermediate-frequency signal and for heterodyning a signal transmitted directly from the transmitter to an intermediate-frequency signal, amplifying means for amplifying said intermediate-frequency signals, a second detector to which the intermediate-frequency signals are applied for producing a beat-frequency signal, said system having two unavoidable cross-coupling paths $l_1$ and $l_2$ from the transmitter oscillator to the receiver mixer, the path $l_1$ comprising cables or conductors interconnecting said transmitter oscillator and said receiver mixer, and the path $l_2$ being a path by way of the leakage radiation path between the two antennas, the two currents traversing said two cross-coupling paths appearing at the input circuit of said second detector as two intermediate-frequency currents $i_1$ and $i_2$, and means for maintaining the phase of the currents $i_1$ and $i_2$ with respect to a reference current substantially constant whereby amplitude modulation effects due to spurious frequency modulation of the transmitter oscillator are avoided.

4. In a radio locator system of the type utilizing reflected waves, transmitting means including a transmitter antenna and a transmitter oscillator for transmitting a radio signal to a wave reflecting surface, means including a receiver antenna and a receiver mixer for receiving said signal after it has been reflected from said wave reflecting surface, means including a local heterodyne oscillator for heterodyning said reflected signal to an intermediate-frequency signal and for heterodyning a signal transmitted directly from the transmitter to an intermediate-frequency signal, amplifying means for amplifying said intermediate-frequency signals, a second detector to which the intermediate-frequency signals are applied for producing a beat-frequency signal, a frequency discriminator to which at least one of said intermediate-frequency signals is applied, an automatic-frequency-control means for said heterodyne oscillator to which means the output of said discriminator is applied for reducing the width of the frequency band occupied by said intermediate-frequency signals, said system having two unavoidable cross-coupling paths $l_1$ and $l_2$ from the transmitter oscillator to the receiver mixer, the path $l_1$ comprising cables or conductors interconnecting said transmitter oscillator and said receiver mixer, and the path $l_2$ being a path by way of the leakage radiation path between the two antennas, the two currents traversing said two cross-coupling paths appearing at the input circuit of said second detector as two intermediate-frequency currents $i_1$ and $i_2$, and means for maintaining the phase of the currents $i_1$ and $i_2$ with respect to a reference current substantially constant whereby amplitude modulation effects due to spurious frequency modulation of the transmitter oscillator are avoided.

5. In a radio locator system of the type utilizing reflected waves, transmitting means including transmitter antenna and a transmitter oscillator for transmitting a radio signal to a wave reflecting surface, means including a receiver antenna and a receiver mixer for receiving said signal after it has been reflected from said wave reflecting surface, means including a local heterodyne oscillator connected through a cable of electrical length $l_c$ to said receiver mixer for heterodyning said reflected signal to an intermediate-frequency signal, a receiver intermediate-frequency amplifier for amplifying said intermediate-frequency signal, a control mixer to which signal is fed from said transmitter oscillator through a cable of electrical length $l_a$, a connection from said local oscillator through a cable of electrical length $l_b$ to said control mixer for heterodyning the signal transmitted over cable length $l_a$ to an intermediate-frequency signal, a control intermediate-frequency amplifier for amplifying said last intermediate-frequency signal, a second detector to which said amplified intermediate-frequency signals are applied for producing a beat-frequency signal, said system having two unavoidable cross-coupling paths of electrical lengths $l_1$ and $l_2$ from the transmitter oscillator to the receiver mixer, the path length $l_1$ being the sum of the cable lengths $l_a$, $l_b$ and $l_c$, and the path length $l_2$ being the leakage radiation path between the two antennas plus the electrical lengths of the cables between the transmitter oscillator and transmitting antenna and between the receiver mixer and the receiving antenna, said cable and path lengths and said intermediate-frequency amplifiers having substantially such lengths and phase characteristics, respectively, that $$2l_b = \frac{10^2 k}{1.2}\left(\frac{\Delta\phi''}{\Delta F} - \frac{\Delta\phi'}{\Delta F}\right)$$

and $$l_2 + l_b - l_a - l_c = \frac{10^2 k}{1.2}\left(\frac{\Delta\phi''}{\Delta F} - \frac{\Delta\phi'}{\Delta F}\right)$$

where $k$=ratio of frequency change of the intermediate-frequency current to the frequency change of the transmitter oscillator current, $$\frac{\Delta\phi'}{\Delta F}$$

=phase slope of the receiver intermediate-frequency amplifier in degrees per megacycle frequency change, and $$\frac{\Delta\phi''}{\Delta F}$$

=phase slope of the control intermediate-frequency amplifier in degrees per megacycle frequency change.

6. In a radio locator system of the type utilizing reflected waves, transmitting means including a transmitter antenna and a transmitter oscillator for transmitting a radio signal to a wave reflecting surface, means including a receiver antenna and a receiver mixer for receiving said signal after it has been reflected from said wave reflecting surface, means including a local heterodyne oscillator connected through a cable of electrical length $l_c$ to said receiver mixer for heterodyning said reflected signal to an intermediate-frequency signal, a receiver intermediate-frequency amplifier for amplifying said intermediate-frequency signal, a control mixer to which signal is fed from said transmitter oscillator through a cable of electrical length $l_a$, a connection from said local oscillator through a cable of electrical length $l_b$ to said control mixer for heterodyning the signal transmitted over cable length $l_a$ to an intermediate-frequency signal, a control intermediate-frequency amplifier for amplifying said last intermediate-frequency signal, a second detector to which said amplified intermediate-frequency signals are applied for producing a beat-frequency signal, a frequency discriminator to which at least one of said intermediate-frequency signals is applied, and an automatic-frequency-control means for said heterodyne oscillator to which means the output of said discriminator is applied for reducing the width of the frequency band occupied by said intermediate-frequency signals, said system having two unavoidable cross-coupling paths of electrical lengths $l_1$ and $l_2$ from the transmitter oscillator to the receiver mixer, the path length $l_1$ being the sum of the cable lengths $l_a$, $l_b$ and $l_c$, and the path length $l_2$ being the leakage radiation path between the two antennas plus the electrical lengths of the cables between the transmitter oscillator and transmitting antenna and between the receiver mixer and the receiving antenna, said cable and path lengths and said intermediate-frequency amplifiers having substantially such lengths and phase characteristics, respectively, that $$2l_b = \frac{10^2 k}{1.2}\left(\frac{\Delta\phi''}{\Delta F} - \frac{\Delta\phi'}{\Delta F}\right)$$

and $$l_2 + l_b - l_a - l_c = \frac{10^2 k}{1.2}\left(\frac{\Delta\phi''}{\Delta F} - \frac{\Delta\phi'}{\Delta F}\right)$$

where $k$=ratio of frequency change of the intermediate-frequency current to the frequency change of the transmitter oscillator current, $$\frac{\Delta\phi'}{\Delta F}$$

=phase slope of the receiver intermediate-frequency amplifier in degrees per megacycle frequency change, and $$\frac{\Delta\phi''}{\Delta F}$$

=phase slope of the control intermediate-frequency amplifier in degrees per megacycle frequency change.

7. The invention according to claim 5 wherein $$\frac{\Delta\phi''}{\Delta F}$$

and $$\frac{\Delta\phi'}{\Delta F}$$

are substantially equal.

8. The invention according to claim 6 wherein $$\frac{\Delta\phi''}{\Delta F}$$

and $$\frac{\Delta\phi'}{\Delta F}$$

are substantially equal.

9. The invention according to claim 5 wherein line stretcher means is provided in at least two of the cables in the system for balancing residual amplitude variations due to spurious frequency modulation against amplitude modulation on the currents $i_1$ and $i_2$.

10. In a radio locator system of the type utilizing reflected waves, transmitting means including transmitter antenna and a transmitter oscillator for transmitting a radio signal to a wave reflecting surface, means including a receiver antenna and a receiver mixer for receiving said signal after it has been reflected from said wave reflecting surface, means including a local heterodyne oscillator for heterodyning said reflected signal to an intermediate-frequency signal, amplifying means for amplifying said intermediate-frequency signal, a second detector to which the intermediate-frequency signal is applied, means for applying to said second detector a beating current having said local oscillator as its source for producing a beat-frequency signal, said system having a leakage path from the transmitter to the receiver resulting in leakage current at the second detector, means for adjusting the phase of the leakage current at said second detector relative to the phase of the beating current at the second detector so that the two currents are in phase at the mid-point of the frequency modulation swing, whereby the interfering effect of the leakage current is minimized.

RENE A. BRADEN.

REFERENCES CITED

The following references are of record in the file of this patent:

UNITED STATES PATENTS

| Number | Name | Date |
|---|---|---|
| 2,050,418 | Boerner | Aug. 11, 1936 |
| 2,253,975 | Guanella | Aug. 26, 1941 |
| 2,419,046 | Wolf | Apr. 15, 1947 |

FOREIGN PATENTS

| Number | Country | Date |
|---|---|---|
| 113,239 | Australia | June 19, 1941 |